US012543733B2

(12) United States Patent
Nameirakpam et al.

(10) Patent No.: US 12,543,733 B2
(45) Date of Patent: Feb. 10, 2026

(54) BIOFUMIGANT COMPOSITION AND A PROCESS FOR THE PREPARATION THEREOF

(71) Applicant: INSTITUTE OF BIORESOURCES AND SUSTAINABLE DEVELOPMENT, Manipur (IN)

(72) Inventors: Bunindro Nameirakpam, Imphal (IN); Sonia Sougrakpam, Imphal (IN); Y. Rajashekar, Imphal (IN); Jharna Chakravorty, Itanagar (IN); Pulok K. Mukherjee, Imphal (IN)

(73) Assignee: INSTITUTE OF BIORESOURCES AND SUSTAINABLE DEVELOPMENT (IN)

( * ) Notice: Subject to any disclaimer, the term of this patent is extended or adjusted under 35 U.S.C. 154(b) by 336 days.

(21) Appl. No.: 18/033,314

(22) PCT Filed: Nov. 10, 2021

(86) PCT No.: PCT/IN2021/051060
§ 371 (c)(1),
(2) Date: Apr. 21, 2023

(87) PCT Pub. No.: WO2022/101932
PCT Pub. Date: May 19, 2022

(65) Prior Publication Data
US 2024/0389586 A1  Nov. 28, 2024

(30) Foreign Application Priority Data
Nov. 10, 2020  (IN) .............................. 202031049091

(51) Int. Cl.
*A01N 43/08* (2006.01)
*A01N 65/12* (2009.01)
*A01N 65/44* (2009.01)
*A01P 7/04* (2006.01)

(52) U.S. Cl.
CPC ............. *A01N 43/08* (2013.01); *A01N 65/12* (2013.01); *A01N 65/44* (2013.01); *A01P 7/04* (2021.08)

(58) Field of Classification Search
None
See application file for complete search history.

(56) References Cited

FOREIGN PATENT DOCUMENTS

| WO | 2013/155438 A1 | 10/2013 |
|---|---|---|
| WO | 2016/190661 A1 | 12/2016 |

OTHER PUBLICATIONS

Prasad et al. "Antagonism of ethanol narcosis by histidyl-proline diketopiperazine", Nature, pp. 1-5, 1977.
Barbara Nieradko-Iwanicka "The Influence of Synthetic Pyrethroids on Memory Processes, Movement Activity and Co-Ordination in Mice", pp. 1-8, Jan. 2012, In book: Insecticides—Advances in Integrated Pest Management.
Sparks, Casida, J. E. & Quistad, G. B et al. "Chloropicrin: reactions with biological thiols and metabolism in mice", pp. 1, Sep. 1997, Chem Res Toxicol, vol. 10, No. 9.
Cumming et al. "The Role of Imagery in Performance", pp. 1-11, Jan. 2012, In book—Handbook of Sport and Performance Psychology.
P.A. Paranagama, et al. "Fungicidal and anti-aflatoxigenic effects of the essential oil of Cymbopogon citratus (DC.) Stapf. (lemongrass) against Aspergillus flavus Link. isolated from stored rice" pp. 1-2, Jul. 1, 2003, Lett Appl Microbiol, vol. 37, No. 1.
Ogendo et al. "Management of stem borers using selected botanical pesticides in a maize-bean cropping system" pp. 1-11, Jan. 2013, Egerton J. Sci. & Technol. vol. 13.
Kim et al. "An integrated theory for improved skill acquisition and retention in the three stages of learning, Theoretical Issues in Ergonomics Science" vol. 14, No. 1, pp. 1-10, Feb. 2013.
Park et al. "Yeast frataxin sequentially chaperones and stores iron by coupling protein assembly with iron oxidation" vol. 278, No. 33, Issue of Aug. 15, pp. 31340 -31351, (Mar. 2003), Journal of Biological Chemistry.
Fahd Mohammed Abd Al Galil, et al. "Effects of insecticide dimethoate on the developmental rate of forensic importance sarcophagid flies" Journal of King Saud University—Science vol. 33, Issue 2; Mar. 2021, 101349.
Bond et al. "Culture-Level Dimensions of Social Axioms and Their Correlates Across 41 Cultures" Journal of Cross-Cultural Psychology; Sep. 2004.
Dhaliwal et al. "Insect Pest Problems and Crop Losses: Changing Trends", Indian Journal of Ecology 2010 vol. 37 No. 1 pp. 1-7.
Isman, M.B et al. "Bridging the gap: Moving botanical insecticides from the laboratory to the farm" Industrial Crops and Products, vol. 110, Dec. 30, 2017, pp. 10-14.
Dayan et al. "On Some Topological Indices of Triangular Silicate and Triangular Oxide Networks" IJPSR (2018), vol. 9, Issue 10.
Saleem et al. "Insecticidal Activities of Two Citrus Oils Against Tribolium Castaneum (Herbst)" American Journal of Research Communication, 2013.
Yao et al. "Laser-Based Gene Transfection and Gene Therapy" IEEE Transactions on Nanobioscience, vol. 7, No. 2, Jun. 2008.
Herve et al. "Plant biodiversity and vegetation structure in traditional cocoa forest gardens in southern Cameroon under different management" Biodivers Conserv, pp. 1-15, 2008, vol. 17.
Morgan, M. E. et al. Zinc can play chaperone-like and inhibitor roles during import of mitochondrial small Tim proteins, J Biol Chem, pp. 1-2, 2009, vol. 284, No. 11.
Liu et al. "The polarisome is required for segregation and retrograde transport of protein aggregates" vol. 140, Issue 2, p. 257-267, Jan. 22, 2010, Cell.

(Continued)

*Primary Examiner* — Susan Hoffman

(57) ABSTRACT

The present invention relates to a composition having strong insecticidal activity and a process of preparation thereof. More particularly, the present invention relates to a novel biofumigant composition and a process for the preparation of a biofumigant. The biofumigant composition is eco-friendly, biodegradable. Further, the biofumigant composition is effective against stored product insects such as *Sitophilus oryzae, Corcyra cephalonica* and *Tribolium castaneum*. Moreover, since the biofumigant does not result in any adverse effect on the seed germination and growth of plant, therefore the composition is found to be highly desirable for grain protection against stored-product insect pests.

8 Claims, 5 Drawing Sheets

(56) References Cited

OTHER PUBLICATIONS

Hurtado et al. "Multiphase photo-capillary reactors coated with TiO2 films: Preparation, characterization and photocatalytic performance" Jun. 2016 Chemical Engineering Journal 304.
Rajashekar et al. "Botanicals as Grain Protectants" Review Article, vol. 2012 | Article ID 646740, Apr. 2012, Psyche.
Yi et al. "Function and molecular mechanism of acetylation in autophagy regulation" Science, vol. 336, Issue 6080, Apr. 2012.
Cardiet et al. "Contact and fumigant toxicity of some essential oil constituents against a grain insect pest Sitophilus oryzae and two fungi, Aspergillus westerdijkiae and Fusarium graminearum" J Pest Sci (2012) 85:351-358 Original Paper, Sep. 2011.
Bianca Ivanescu et al. "Importance of Phytosterols and their Determination in Herbal Medicines" 2013 E-Health and Bioengineering Conference (EHB) Nov. 2013.
C. Kathirvelu and R. Senthoor Raja et al. "Efficacy of Selected Plant Extracts as Insecticidal Fumigant Against Certain Stored Grain Insect Pests" Plant Archives vol. 15 No. 1, 2015 pp. 259-266 (Jan. 2015).
Rajashekar et al., "Smart Phone User Behaviour Characterization bas on Autoencoders and Self Organizing Maps", Faculty of Computer Science. pp. 1-8, Dec. 2016, 16th International Conference on Data Mining Workshops.
Rodda et al. "Molecular Breeding for Ascochyta Blight Resistance in Lentil: Current Progress and Future Directions" pp. 1-9, Jun. 2017 | vol. 8 | Article 1136, Frontiers in Plant Science.
Yadla et al. Studies on genetic diversity and variability for yield and quality traits in promising germplasm lines in rice (*Oryza sativa* L.) The Pharma Innovation Journal 2020; 9(1): 391-399 (Jun. 2020).
Hu et al. "Sensitivity and Responses of Chloroplasts to Heat Stress in Plants" Front. Plant Sci., vol. 11, Apr. 2020.
Vika Ichsania Ninditya, et al., "Artemisia vulgaris efficacies against various stages of Aedes aegypti," Veterinary World, vol. 13, Issue 7, pp. 1423-1429 (Jul. 2020).

BIOFUMIGANT COMPOSITION AND A PROCESS FOR THE PREPARATION THEREOF

FIELD OF THE INVENTION

The present invention relates to a composition having strong insecticidal activity and a process for preparation thereof. More particularly, the present invention relates to a novel biofumigant composition and a process for the preparation of a biofumigant. The biofumigant composition is eco-friendly, biodegradable and is highly effective against stored grain insect pests.

BACKGROUND OF THE INVENTION

Food grain losses due to insect infestation during storage are a serious problem, particularly in the developing countries. Losses caused by insects include not only the direct consumption of kernels, but also accumulation of exuviae, webbing and cadavers. High levels of the insect detritus may result in grain that is unfit for human consumption and loss of the food commodities, both, in terms of quality and quantity. Insect infestation-induced changes in the storage environment may cause warm moist 'hotspots' that provides suitable conditions for storage fungi that cause further losses. It is estimated that more than 20,000 species of field and storage pests destroy approximately one-third of the world's food production, valued annually at more than $100 billion among which the highest losses (43%) occurring in the developing world. The quantitative and qualitative damage to the stored grains and grain product from the insect pests may amount to 20-30% in the tropical zone and 5-10% in the temperate zone.

Food grain production in India has reached 28.95 million tons in the year 2018-2019 and 291.38 million tons in the year 2019-2020, out which nearly 12-15% food grains are damaged by stored grain insect pests. The efficient control and removal of stored grain pests from food commodities has long been the goal of entomologists throughout the world. The major pests of stored grain and pulses of the Indian subcontinent are classified in to two groups viz., primary pests: those which are capable of penetrating and infesting intact kernel of grain and have immature stages developed within kernel of grain and secondary pests which cannot infest the whole grain, but feed on as broken kernels, debris, high moisture weed seeds, and grain damaged by primary pests. In general, the immature stages of the secondary pest species are found external to the grain. It is often thought that secondary invaders cannot initiate infestation. The important primary pests are the rice weevil, *Sitophilus oryzae* (L.), granary weevil, *Sitophilus granaries* (L.), (Coleoptera: Curulionidae), lesser grain borer, *Rhyzoperth adominica* (F.), (Coleoptera: Bostrychidae), khapra beetle, *Trogoderma granarium* (Everts), (Coleoptera: Dermestidae) and the pulse beetle *Callasobruchus chinensis* (L.) (Coleoptera: Bruchidae). The secondary pests are: rust-red flour beetle, *Tribolium castaneum* (Herbst), (Coleoptera: Tenebriodae), rusty grain beetle, *Cryptolestes ferrugineus* (L.), (Coleoptera: Cucujidae), sawtoothed grain beetle, *Oryzaephilus surinamensis* (L.), (Coleoptera: Silvanidae), mites, (Acarina: Tetranychidae) *Liposcelis corrodens*, (Psocoptera: Liposcelidae).

There are several reports since 1950s, wherein synthetic insecticides have been used extensively in grain facilities to control stored product insect pests. Further, fumigants such as methyl bromide, phosphine, cyanogens, ethyl formate or sulfuryl fluoride are known to rapidly kill all life stages of stored product insects in a commodity or in a storage structure.

Rajashekar et al. 2016 and Oerke et al. 2006 described the use of chemical insecticides in the agriculture and also the post-harvest storage for pest control.

Casida, J. E. & Quistad, G. B et al. 1998 and Dayan et al. 2007 described the status of environmental concerns, health hazards, and the evolution of resistance in insect pests, Further, the documents also described several chemical insecticides which are banned or restricted in use.

Rajendran and Sriranjin et al. 2008 and Rajashekar et al. 2012 reported plant secondary metabolites have historically served a key role in agriculture as repellents and insecticides.

Morgan, M. E. et al. 2009 and Jennifer et al. 1998 reported Azadirachtin, extracted from neem and its use as insect repellent, anti-feedant and insect growth regulator. Further, the document reported that Azadirachtin lacks fumigant toxicity to insects and the commercialization of product was not successful due to slow action and bitter taste. However, it was found to be useful in integrated pest management.

Isman, M. B et al. 2006 and Yi et al. 2012 reported one of the earliest plant derived insecticides, rotenone derived from the derris root and its role as insecticides. However, it was reported that it is toxic to the mammalian systems. Therefore, its use as a controller for stored grain pests was not accepted.

Breese, M. H. et al. 1977 and Casida, J. E. et al. 1980 described pyrethroids as insecticide modelled after natural pyrethrins from the flowers of *Tanacetum cinerariaefolium*. It was reported that it showed broad spectrum of insecticidal activity with swift knockdown, high degree of repellency to insect pests and fast break down in the environment. However, its use is highly restricted because of the development of insect resistance and high cost.

Bett et al. 2016 disclosed essential oils of *Cupressus lusitanica* and *Eucalyptus saligna* and their toxic effect on *Sitophilus zeamais* with $LC_{50}$ values of 29.1 and 26.8 50 µl/L air, after 24 hours of exposure. However, the study lacked data on toxicity of other stored grain insect pest.

Devi et al. 2020 revealed that the essential oils of lemongrass (*C. flexuosus*) are more toxic in fumigant assay against *S. oryzae* followed by *C. winterianus*, *C. martini* and *P. cablin*, with median lethal dosage of 44.5 & 26.1 µl/L air at 24 and 48 hours of exposures, respectively. However, the document lacked data on mammalian toxicity.

Kim et al. 2003 described methanol extracts of 30 aromatic medicinal plant species and five essential oils tested for their insecticidal activities against adults of *Sitophilus oryzae* and *Callosobruchus chinensis*. However, it was reported that 100% insect mortality was achieved only at higher dosage of 3.5 mg/cm$^2$ at 24 hours of exposure from the extracts of *Cinnamomum cassia* bark, Cinnamon oil, horseradish (*Cocholeria aroracia*) oil, and mustard (*Brassica jumcea*) oil.

Sukontason et al. 2004 reported Eucalyptol or 1,8-Cineole as a poor comparison to the synthetic insecticides and also toxicity to housefly at $LD_{50}$ 118 µg/fly. Further, it was reported that Eucalyptol yielded a weak larvicide effect.

Park et al. 2003 and Yao et al. 2008 described rhizomes of Acorus calamus and the active ingredients (β-asarone and (Z)-asarone) which have been investigated for its insecticidal properties. However, the compounds showed effectiveness to adult insects at high concentrations and also at long exposure periods from 3 to 7 days which varied with insect species. Further, these compounds exhibited carcinogenic and mutagenic effects. Therefore, in view of their health hazards, they were not successful as insecticides.

Bisseleua et al. 2008 described crude extracts from the various parts of *Griffonia simplicifolia* and *Zanthoxylum xanthoxyloides* applied topically to insects and their toxicity to flies. The drawbacks observed were that the crude extracts of *Z. xanthoxyloides* were less effective against larvae, pupae and adult housefly. Crude extracts of *G. simplicifolia* were effective on growth inhibition and prolonged developmental period.

Bond et al. 2004 described Spinosad, a natural insecticide, proved to be highly toxic to larvae of *Aedes aegypti* and *Anopheles albimanus*. The document also described drawbacks of Spinosad such as high cost alternative biological insecticide. However, its effect on stored grain insect pests and possible adverse effects of a larvicide on non-target aquatic invertebrates were not studied.

Cardiet et al. 2012 reported allylisothiocyanate isolated from mustard seed, which was found to be toxic against the adults of *S. oryzae* at less than 6.3 µl/l on 24 hours of exposure time, but it lacked insect and mammalian toxicity.

Ogendo et al. 2003 described crude powder of *Lantana camara*, tested toxic and repellent against *Sitophilus zeamais*. The paper referred only about the repellency of crude powder of *L. camara* against one stored grain.

Rajashekar et al. 2013 described isolated biofumigant Coumaran, which was found to be highly toxic to various insects including the household and stored grain insect pests. The study lacked data on mammalian toxicity and grain protectant.

Rajashekar et al. 2016 reported 2,3, dimethyl maleic anhydride extract for *Colocasia esculenta*, which was found to be highly toxic to stored grain insect pest, but the study lacked data on mammalian toxicity.

Bianca Ivanescu et al. 2015 described various sesquiterpene lactones from *artemisia* genus. The review articles also described the biological activities and their method of analysis.

Liu et al. 2010 described essential oils of *Artemisia mongolica* and *Artemisia capillaris* which also possessed strong fumigant activity against *Sitophilus zeamais* adults with $LC_{50}$ values of 7.35 and 5.31 mg/L, respectively.

Shanshan et al. 2020 reported essential oil (EO) of *A. vulgaris* (mugwort) which was found as a strong toxicant, that inhibits the growth, development, and reproduction of *T. castaneum*. Khalid Abu-Shandi et al. 2017 reported phytochemical compounds isolated from the aerial parts of *Artemisia vulgaris* and their application in traditional medicine.

Gaudencio M. Natividada et al. 2011 disclosed the applications of the medicinal plant *Artemisia vulgaris* for antagonistic activity and its traditional use in asthma and hyperactive gut.

C. Kathirvelu and R. Senthoor Raja et al. 2015 disclosed various plant extracts obtained from *A. vulgaris, E. globulus* and *M. piperita* and their role as fumigants, to minimize the insect population in the grains during storage.

Thus, several studies and reports suggest that fumigation plays an important role in preservation of food grain stocks in central storages. Chemical fumigants such as aluminium phosphide tablets/methyl bromide are extensively been used till now. Although fumigants are generally effective, lack of persistence in the treated grain infestation may occur within a few weeks after treatment. Further, it has been reported that desired 100% insect morality is not achieved. Moreover, the use of various chemical fumigants such as methyl bromide is banned as they have been found to contribute in ozone depletion. Thus, due to environmental concerns and human health hazards, many insecticides have been replaced by modern insecticides. At present, there is no available biofumigant which can replace phosphine and methyl bromide for protection of stored grain from insect infestation. Therefore, there is an urgent need to develop alternate fumigants for insect pest control in food grains stored in indoor and outdoor. Particularly, there is need for a potent, biodegradable pesticide or an insecticidal composition of natural origin which has good insecticidal activity against stored product insect pests.

SUMMARY OF THE INVENTION

In an aspect of present invention, there is provided a biofumigant composition comprising isosecotanapartholide in an amount ranging from 90-95% and lemon grass oil in an amount ranging of 5-10%.

In an embodiment, the present invention provides a biofumigant composition, wherein the isosecotanapartholide is obtained from aerial parts of the plant *Artemisia vulgaris*.

In another embodiment, the present invention provides a biofumigant composition, wherein the composition is having insecticidal properties against stored product insects selected from *Sitophilus oryzae, Tribolium castaneum* and *Corcyra cephalonica*.

In an embodiment, the present invention provides a biofumigant composition, wherein the biofumigant further comprises a carrier selected from carbon dioxide, nitrogen or a combination thereof.

In another embodiment, the present invention provides a biofumigant composition, wherein the biofumigant is having an insecticidal activity in the range of $LC_{50}$ 2.4-2.9 µg/L in air against stored grain insect pests.

In another aspect of the present invention, there is provided a process for preparation of a biofumigant, wherein the said process comprises the steps of:
(a) drying aerial parts of *A. vulgaris* at a temperature in the range of 30-40° C. for duration of 48 hours and fine powdered;
(b) extracting dried powder from aerial parts of *A. vulgaris* with an organic solvent;
(c) evaporating the organic solvent extract under vacuum evaporator and dissolving the residue in 15-20 ml of methanol.
(d) fractionating the methanolic extract obtained in step c) and subjecting it to silica gel column chromatography followed by eluting with polar solvents to obtain active insecticidal active fraction;
(e) pooling, concentrating the insecticidal active fraction of step d) and further purifying by flash chromatography followed by preparative high performance liquid chromatography (HPLC) to obtain purified fraction;
(f) obtaining bioactive compound in the range of 90-95% from purified fraction and adding lemon grass oil to obtain a biofumigant.

In an embodiment, the present invention provides a process for preparation of a biofumigant, wherein the bioactive compound is isosecotanapartholide.

In another embodiment, the present invention provides a process for preparation of a biofumigant, wherein in step b), the organic solvent is selected from the group consisting of hexane, chloroform, ethyl acetate, acetone and methanol.

In an embodiment, the present invention provides a process for preparation of a biofumigant, wherein in step d), the polar solvent used for eluting the insecticidal extract is selected from the group consisting of chloroform, ethyl acetate, and methanol. In another embodiment, the present invention provides a process for preparation of a biofumigant, wherein the bioactive compound thus obtained is having a molecular mass of 278.

These and other features, aspects, and advantages of the present subject matter will be better understood with reference to the following description. This summary is provided to introduce a selection of concepts in a simplified form

BRIEF DESCRIPTION OF THE ACCOMPANYING FIGURES

The following figures form part of the present specification and are included to further illustrate aspects of the present disclosure. The disclosure may be better understood by reference to the figures in combination with the detailed description of the specific embodiments presented herein.

Figure 6:
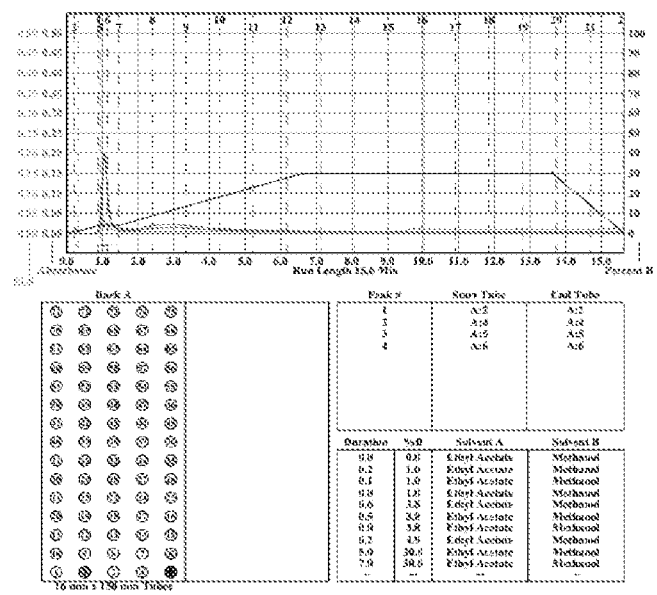

FIG. 6 depicts flash chromatogram of the active subfraction (XII-C) separated on a 4 g RediSep column. The solvent gradient of Percent B (Methanol, right-blue axis) in ethyl acetate is denoted by the blue trace and the signal was monitored (UV detection: 254/280 nm, left-red axis, red trace, ELSD: Left-green axis, green trace). Black numbers represent collection tube numbers in top of chromatogram.

Figure 7:
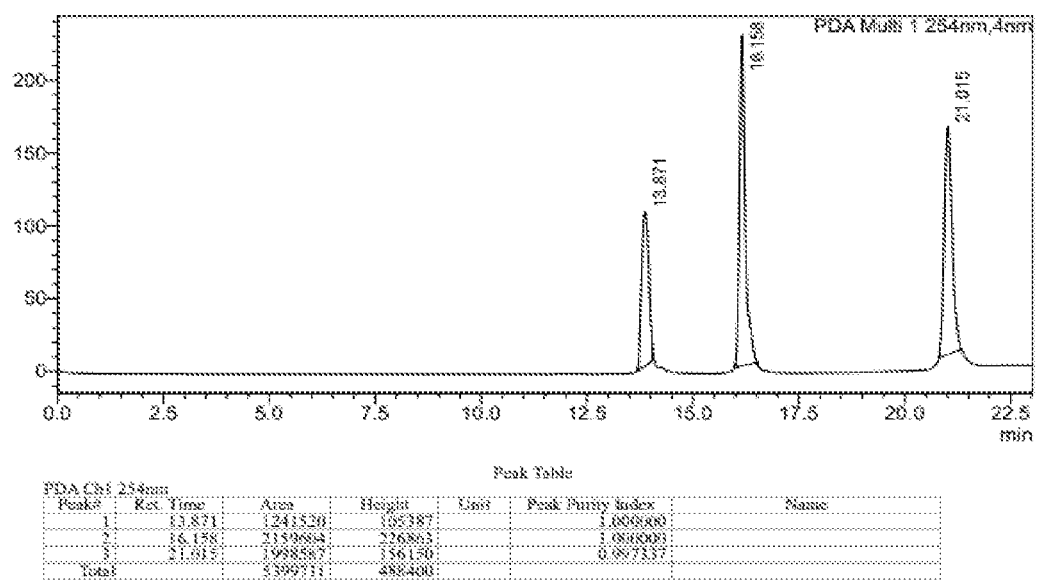

FIG. 7 depicts HPLC chromatogram of the pooled compounds separated using C-18 column (10 mm×250 mm, 5 μm) shim-pack GIS, Shidmazu. The number above each peak denotes the retention times.

Figure 8:
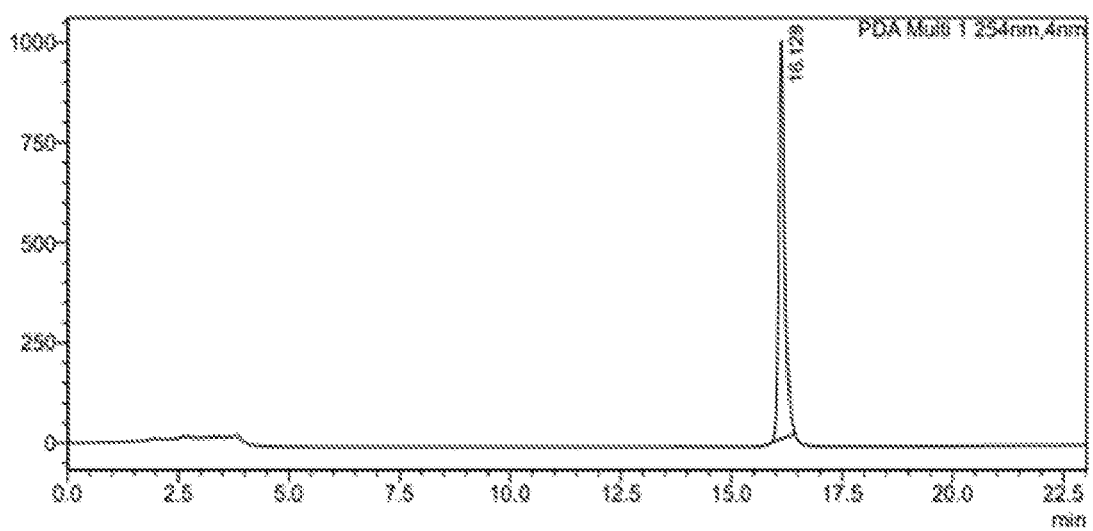

FIG. 8 depicts HPLC chromatogram of the biofumigant

Figure 9:
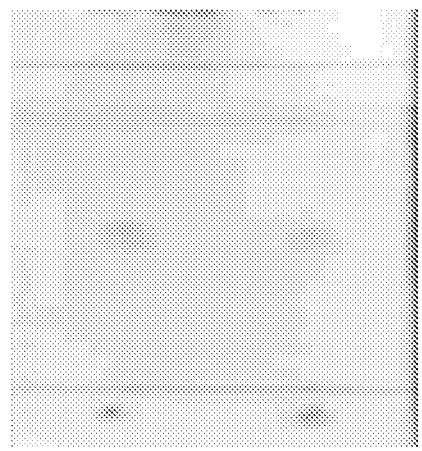

FIG. 9 depicts Thin Layer Chromatogram (TLC) of biofumigant

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps of the process, features of the product, referred to or indicated in this specification, individually or collectively, and any and all combinations of any or more of such steps or features.

Definitions

For convenience, before further description of the present invention, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present invention is not to be limited in scope by the specific embodiments described herein, which are intended for the purposes of exemplification only. Functionally-equivalent products and methods are clearly within the scope of the disclosure, as described herein.

The present invention provides a novel biofumigant composition and a process for a preparation of a biofumigant. The biofumigant composition comprises an isosecotanapartholide in an amount ranging from 90-95% and lemon grass oil in an amount ranging of 5-10%. The biofumigant composition of the present invention is eco-friendly and highly toxic to stored product insect pests. Further, the composition can be used to treat food grain/seeds to prevent spoilage by insect pests and could also be employed in insect vectors and wood borer. Particularly, the biofumigant is found to be useful against stored product insects pests such as *Corcyra cephalonica* Stainton (Lepidoptera: Pyralidae) (rice meal moth), *Tribolium castaneum* (rust-red flour beetle) and *Sitophilus oryzae* (rice weevil). It is also effective against insect vectors and can also be used against major domestic and veterinary pests.

In addition, the composition of the present invention does not caused any adverse effect on the seed germination and plant growth.

The compound isosecotanapartholide is obtained from the aerial parts of *A. vulgaris*. The genus *Artemisia*, in the family Asteraceae, is a well known for its ethno botanical use. In particular, the plant *A. vulgaris* wall, commonly known as Mugwort, is a universal herb used for folk medicine and religious purposes throughout the ancient world. The plant *A. vulgaris* seem to have originated in eastern Asia and is a very common weed in Indo-Burma Biodiversity hotspot and China. The plant has also been acknowledged for its ethnobotanical use in antitumor activity, antipyretic tonic, antispasmodic, antibacterial, antifungal and stimulant properties for the plant or its oil.

Thus, according to one aspect of the present invention, there is provided a novel biofumigant composition comprising isosecotanapartholide in an amount ranging from 90-95% and lemon grass oil in an amount ranging of 5-10%.

As used herein, the term "biofumigant" includes various forms in which the biofumigant of the present invention can be applied, including liquids, coils, sprays and tablets.

In an embodiment, the present invention provides a biofumigant composition, wherein isosecotanapartholide is obtained from aerial parts of the plant *Artemisia vulgaris*.

In another embodiment, the present invention provides a biofumigant composition, wherein the biofumigant is having insecticidal properties against stored product insects selected from *Sitophilus oryzae*, *Tribolium castaneum* and *Corcyra cephalonica*.

In an embodiment, the present invention provides a biofumigant composition, wherein the biofumigant further comprises a carrier selected from carbon dioxide, nitrogen, or a combination thereof.

In another embodiment, the present invention provides a biofumigant composition, wherein the biofumigant is having an insecticidal activity in the range of $LC_{50}$ 2.4-2.9 μg/l in air against stored grain insect pests.

The present invention also provides a process of preparation of a biofumigant, wherein the process comprises the steps i.e. aerial parts of *A. vulgaris* were collected from Phayeng (N 24° 16.275, E 093° 52.651 at an elevation of 874 meter above sea level) Imphal West, Manipur. The aerial parts were then dried shade and fine powdered for Soxhlet extraction using solvents from lower polarity to higher polarity. Each individual extract was evaporated in vacuo and further, tested for bio-fumigant toxicity assay against the stored grain pests. Among them 100% mortality was found in the methanol extract and accordingly, the extract was subjected to silica column chromatography for further bio-assay guided fractionation. Subsequently, the active methanol extract (16.7 g from 1 kg dry powder) was subjected to column chromatography using a glass column packed with silica gel and eluted with hexane and ethyl acetate (ratios of: 100:0, I; 90:10, II; 80:20; III, 70:30; IV, 60:40; and followed by a stepwise gradient of ethyl acetate and methanol (100:0, XII; 50:50, XIII; 0:100, XIV). Accordingly, fourteen fractions of 300 ml were collected, concentrated under reduced pressure using rotary evaporator, and assayed for insecticide activity. Each fraction was tested for their insecticidal activity against test insects (*S. oryzae*) and fractions showing activity were pooled together. The most bioactive fraction (XII-C) was pooled, concentrated and further subjected to flash chromatography. The most bioactive purified active super-fraction (R-16) as assessed by activity (was finally isolated through flash chromatography followed by preparative HPLC and characterized with spectroscopic techniques). The obtained purified fraction was identified and the structure was determined based on the physico-chemical and extensive spectroscopic (MS, 1D and 2D NMR) data analysis and by comparison with the literature data like, 1H NMR, 13C NMR, DEPT-135 & 90, HSQC and HRMS and the bioactive compound as Isosecotanapartholide, (4S,5S)-5-[(3S)-3-hydroxy-2methyl-5-oxocyclopent-1-en-1-yl]-3-methylidene-4-(3oxobutyl)dihydrofuran-2(3H)-one.

The bioactive compound Isosecotanapartholide thus, obtained had molecular ion peak at m/z 278.12 in agreement with its molecular formula $C_{15}H_{18}O_5$. Subsequently, Isosecotanapartholide obtained in the range of 90-95% from purified fraction was added in lemon grass oil to obtain a biofumigant.

In another aspect of the present invention, there is provided a process for preparation of a biofumigant, wherein the said process comprises the steps of:

(a) drying aerial parts of *A. vulgaris* at a temperature in the range of 30-40° C. for duration of 48 hours and fine powdered;

(b) extracting dried powder from aerial parts of *A. vulgaris* with an organic solvent;

(c) evaporating the organic solvent extract under vacuum evaporator and dissolving the residue in 15-20 ml of methanol.

(d) fractionating the methanolic extract obtained in step c) and subjecting it to silica gel column chromatography followed by eluting with polar solvents to obtain active insecticidal active fraction;

(e) pooling, concentrating the insecticidal active fraction of step d) and further purifying by flash chromatography followed by preparative high performance liquid chromatography (HPLC) to obtain purified fraction;

(f) obtaining bioactive compound in the range of 90-95% from purified fraction and adding lemon grass oil to obtain a biofumigant.

In an embodiment of the present invention, there is provided a process of preparation of a biofumigant, wherein the bioactive compound is isosecotanapartholide.

In another embodiment of the present invention, there is provided a process of preparation of a biofumigant, wherein in step b), the organic solvent is selected from hexane, chloroform, ethyl acetate, acetone and methanol.

In an embodiment of the present invention, there is provided a process of preparation of a biofumigant, wherein in step d), the polar solvent used for eluting the insecticidal extract is selected from the group consisting of chloroform, ethyl acetate, and methanol.

In another embodiment of the present invention, there is provided a process of preparation of a biofumigant, wherein the bioactive compound thus obtained is having a molecular mass of 278.

Although the subject matter has been described in considerable detail with reference to certain preferred embodiments thereof, other embodiments are possible.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods, the exemplary methods, devices and materials are described herein. It is to be understood that this disclosure is not limited to particular methods, and experimental conditions described, as such methods and conditions may vary.

Example 1: Process of Obtaining Compound Isosecotanapartholide from Aerial Parts of *A. vulgaris*

Figure 3:
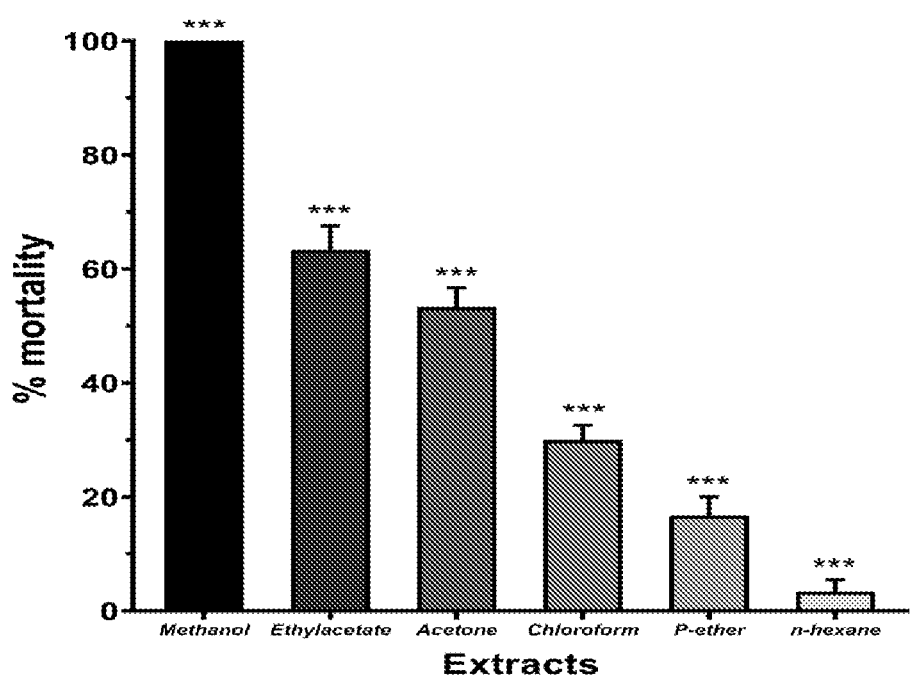
FIG. 3 depicts insecticidal activity of the solvent extracts of *A. vulgaris* to *Sitophilus oryzae* by fumigant bioassay (The extracts were applied at 50 μg/L)

Sample Collection: The aerial parts of *A. vulgaris* were collected from Phayeng (N 24°16.275, E 093° 52.651 at an elevation of 874 meter above sea level) Imphal West, Manipur. The aerial parts were dried shade and fine powdered for Soxhlet extraction using solvents from lower polarity to higher polarity (n-hexane, petroleum ether, ethyl acetate, chloroform, acetone and methanol). Each individual extract was evaporated in vacuo and tested for bio-fumigant toxicity assay against the stored grain pests. Among them 100% mortality was found in the methanol extract and subjected to Silica Column Chromatography for further bioassay guided fractionation (FIG. 3). The active methanol extract (16.7 g from 1 kg dry powder) was subjected to column chromatography using a glass column (length: 100 cm, diameter: 5 cm) packed with silica gel (60-120 mesh) and eluted with hexane and ethyl acetate (ratios of: 100:0, I; 90:10, II; 80:20; III, 70:30; IV, 60:40; V, 55:45; VI, 50:50; VII, 60:40; VIII, 70:30; IX, 80:20; X, 90:10; XI) and followed by a stepwise gradient of ethyl acetate and methanol (100:0, XII; 50:50, XIII; 0:100, XIV). Fourteen fractions of 300 ml each were collected, concentrated under reduced pressure using rotary evaporator, and assayed for insecticide activity. Each fraction was tested for insecticidal activity against test insects (*S. oryzae*) and the fractions showing activity were pooled together.

Analysis by Flash Chromatography: The most bioactive fraction (XII C) was pooled, concentrated and further subjected to flash chromatography. Flash chromatography (RF+ Lumen UV/ELSD) equipped with UV (254, 280 nm)/ELSD was performed by injecting each 5 ml of the active fraction, syringe loaded with 0.45 micro filter onto the RediSep column (Silica 4 g; maximum pressure 200 psi; 20 mg-400 gm sample). The mobile phase was used based on TLC results, for the purification were ethyl acetate and methanol. The RediSep silica column was equilibrated by passing the solvent mixture to remove air and to wet before the injection of the active sample. The separation using the mobile phase was conducted at 18 ml/min in "liquid load" mode by passing the Nitrogen gas at 65 Psi. A single peak in the chromatogram comprising of three compounds were collected on the 15 ml collecting test tubes at a gradient concentration of 95% ethyl acetate and 5% methanol detected by both the UV (254/280 nm) and ELSD detector (FIG. 6).

Analysis by High Performance Liquid Chromatography (HPLC): The semi-preparative HPLC analysis was performed in an SHIMADZU apparatus, using a pump LC-20AP and SPD-M20A PDA detector, with a column shim-pack GIS C18 (10 mm×250 mm, 5 μm) used for the purification of pooled compounds from flash chromatography. Mobile phases included water (solvent A) and acetonitrile (solvent B). A gradient elution program was as follows: 90% A (2 min), 30% A (15 min), 20% A (20 min) and 100% A (22 min). Each injection volume of 500 μl was injected into the column, at a flow rate of 2.5 mL/min. PDA detector (254 nm, 4 nm) detected the three compound peaks at different retention times (13.8, 16.1 & 21 min.) (FIG. 7) were collected manually and concentrated under reduced pressure. Among them, the compound at retention time 16.1 min. showed maximum insecticidal activity (FIG. 8).

Analysis by Thin layer chromatography: Further confirmation of purity compound was done by using thin layer chromatography, which showed a single spot with ethyl acetate and hexane (9:1) as mobile phase (FIG. 9).

NMR analysis: The structure of band was determined by 1H NMR on a Bruker Advance III HD (Bruker, Germany) operating at 600 MHz, using cdcl3 as a solvent. Chemical shifts (δ) and values were reported in ppm and Hz, respectively. Signals were designated as follows: s, singlet; d, doublet; dd, doublet of doublets; t, triplet; m, multiplet.

Figure 1:
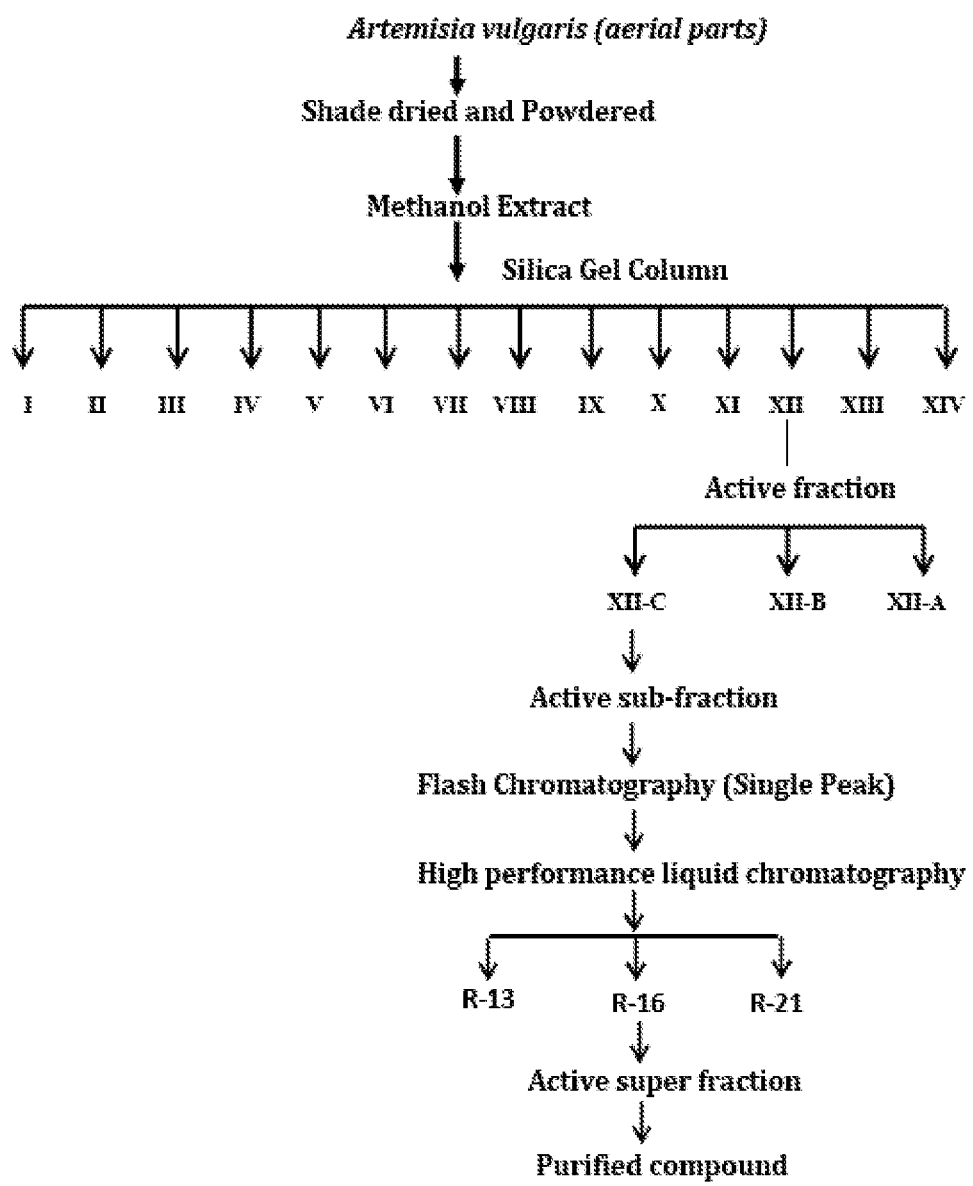
FIG. 1 depicts schematic diagram for process of obtaining compound Isosecotanapartholide from methanol extract of *A. vulgaris*.
Figure 2:
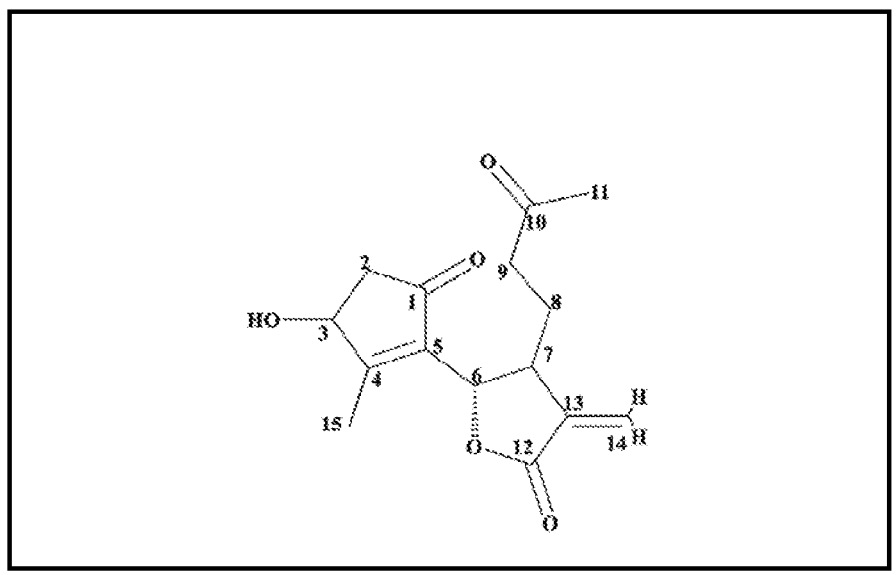
FIG. 2 depicts molecular structure of Isosecotanapartholide.

Characterization of Compound: The structure of the compound was determined based on the physico-chemical and extensive spectroscopic (IR, MS, 1D and 2D NMR) data analysis and by comparison with the literature data. like, 1H NMR, 13C NMR, DEPT-135 & 90, HSQC and HRMS called as Isosecotanapartholide, (4S,5S)-5-[(3S)-3-hydroxy-2methyl-5-oxocyclopent-1-en-1-yl]-3-methylidene-4-(3oxobutyl)dihydrofuran-2(3H)-one, (FIG. 2). Mass spectrum showed the molecular ion peak at m/z 278.12 in agreement with its molecular formula $C_{15}H_{18}O_5$. The compound Isosecotanapartholide was obtained as a pale-yellow liquid, with yield 0.43%, 1H NMR (300 MHz, CDCl3) δ(ppm) 6.3 (s, H-14), 5.62 (s, H-14), 4.9 (s, H-C6), 4.5 (s, H-3), 2.72 (dd, J=H-2), 2.59 (m, 2H-9), 2.3 (dd, H-2), 2.19 (s, 3H-11), 2.18 (s, 3H-15), 1.92 (m, H-9), 1.89 (m, H-9). 13C NMR (125 MHz, CDCl3) δ(ppm) 208 (C-9), 204 (C-1), 174 (C-14), 170 (C-4), 138 (C-13), 137 (C-5), 123 (C-12), 76 (C-6), 72 (C-3), 44 (C-2), 43 (C-7), 39 (C-9), 30 (C-11), 27 (C-8), 14 (C-15). (ES): m/z 301.1061 [M+Na]+(calculated for $C_{15}H_{18}O_5Na$, 301.1052. and Exact mass: 278.12).

Example 2: Evaluating the Insecticidal Activity of Isosecotanapartholide and Lemon Grass Oil Against Adults of Stored-Product Insects (*Corcyra cephalonica, Sitophilus oryzae* and *Tribolium castaneum*)

Culturing of Insects: The stored product insect rice weevil (*S. oryzae* L.) was reared on whole wheat and the rust-red flour beetle (*T. castaneum* Herbst.) was reared on wheat flour with 5% yeast. Rice weevil and flour beetle were maintained at 23.6±2.5° C., 70% relative humidity and a photoperiod of 12:12 (Light:Dark). *Corcyra cephalonica* were reared on medium consisting of finely ground rice and maize flour in the ratio 1:1 (w/w) under laboratory conditions (27±1° C., 75±5% R.H. with a 12:12 h light:dark cycle.

Measuring insecticidal activity of Isosecotanapartholide and Lemon grass oil (*Cymbopogon flexuosus*) by Fumigation Assay: The insecticidal activity of Isosecotanapartholide and lemon grass oil was assessed by fumigation assay against adults of stored-product insects (*Corcyra cephalonica, Sitophilus oryzae* and *Tribolium castaneum*). For each treatment, 50 individuals were tested for *S. oryzae* and *T. castaneum*; particularly adults were released into 0.85 L desiccators that served as the fumigation chambers. In each desiccator, a Whatman No. 1 filter circle (diameter: 9 cm) was placed to serve as an evaporating surface for injecting active extract. The dosages of the tested compound ranged from 0.5 to 3 ppm in air, and the effective dosages were chosen based on trial experiments. Five replicates were used for each dosage and $LC_{50}$ was determined from dose response data using probit analysis. Insect mortality for isosecotanapartholide was recorded after 24 hours of exposure. Insects were considered dead when no leg or antennal movements were observed. Morality rate was calculated using Abbott formula for natural mortality in untreated (Abbott, 1925, Journal of Economic Entomology, 18, 265-267).

Thus, the results indicated that isosecotanapartholide was toxic to stored grain insect pests by fumigation and exhibited $LC_{50}$ values from 1.7-2.2 ug/l and $LC_{90}$ range from 3.2-4.0 μg/l (Table 1).

TABLE 1

Insecticidal activity of purified compound (Isosecotanapartholide) against the adults of stored- product insects by fumigant toxicity.

| Insect species | $LC_{50}^{a,\,b}$ | Slope ± SE | $LC_{90}^{a,b}$ | Slope ± SE | Degrees of freedom |
|---|---|---|---|---|---|
| S. oryzae | 1.82 (1.587-2.051) | 27.69 ± 0.084 | 3.274 (2.857-3.691) | 27.69 ± 0.150 | 12 |
| C. cephalonica | 1.83 (1.607-2.055) | 27.51 ± 0.081 | 3.296 (2.893-3.699) | 27.51 ± 0.145 | 12 |
| T. castaneum | 2.19 (1.989-2.396) | 22.90 ± 0.073 | 3.946 (3.580-4.313) | 22.90 ± 0.132 | 12 |

$^a LC_{50}$ and $LC_{50}$ = µg/L.
$^b$Values in parenthesis represent confidence limits (n = 10).

TABLE 2

Insecticidal activity of lemon grass oil (*Cymbopogon flexuosus*) against the adults of stored- product insects by fumigant toxicity.

| Insect species | $LC_{50}^{a,\,b}$ | $LC_{90}^{a,b}$ | Slope ± SE | Degrees of freedom |
|---|---|---|---|---|
| S. oryzae | 40.5 ± 4.1 (34.0-50.6)) | 78.1 | 20.79 ± 0.078 | 12 |
| T. castaneum | 25.1 ± 3.2 (21.9-29.8 | 45.22 | 1.713 ± 0.065 | 12 |

$^a LC_{50}$ and $LC_{90}$ = µg/L.
$^b$Values in parenthesis represent confidence limits (n = 10).

Example 3: Evaluating the Effect of Isosecotanapartholide on Growth of Plants and Seed Germination In order to assess the effect of isosecotanapartholide on plant growth and seed germination, particularly 50 seeds of Chickpea and Green gram sample were treated with isosecotanapartholide at 50 and 100 ppm and germination tests were done at 24 hours and 72 hours of exposure treatments. From each sample, twenty grains seeds were randomly selected from the treatment and soaked for about 30 minutes in distilled water, and kept on filter paper (paper towel) in a petri dish, moistened everyday with distilled water, and allowed to germinate at room temperature (25±2° C.). After 48 and 72 hours, germinated seeds were counted and percentage germination was determined as in Radwan et al. 2019 (Annals of Agricultural Sciences, 64(2), 183-187). Three replications of each were made for both treatment and control. The germinated seeds were then transferred in a muddy pot and the plant growth was observed for 2 weeks (Monda et al. 2017, Science of the Total Environment, 590, 40-49).

Figure 4:
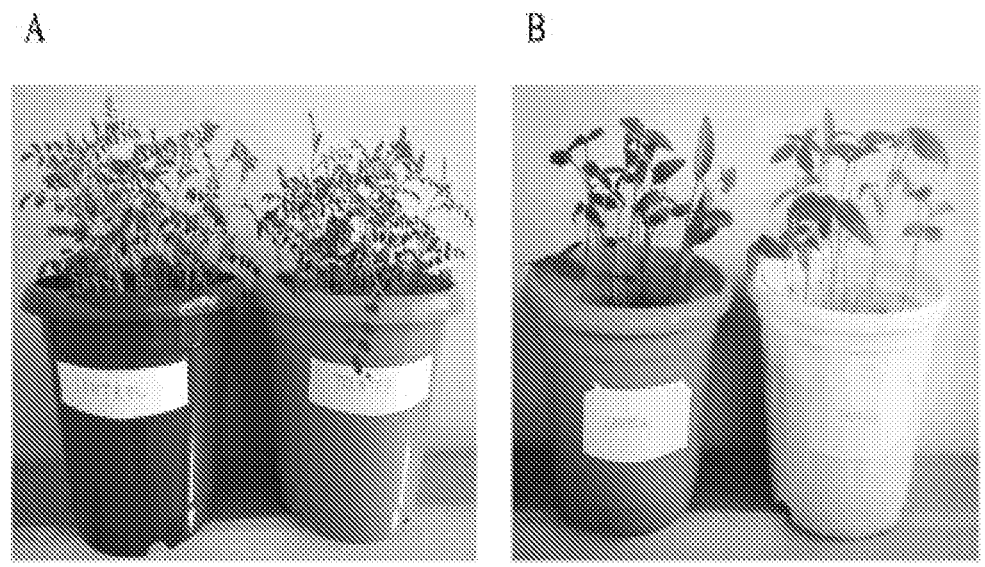
FIG. 4 (A) depicts effect of Isosecotanapartholide (50 ppm) showing response on plant growth of *C. arietinum* comparable to control. (B) depicts effect of Isosecotanapartholide (50 ppm) showing response on plant growth of *V. radiata* comparable to control. No adverse effect was reported in the growth of control and treated plants of *C. arietinum* and *V. radiata*.
Figure 5:
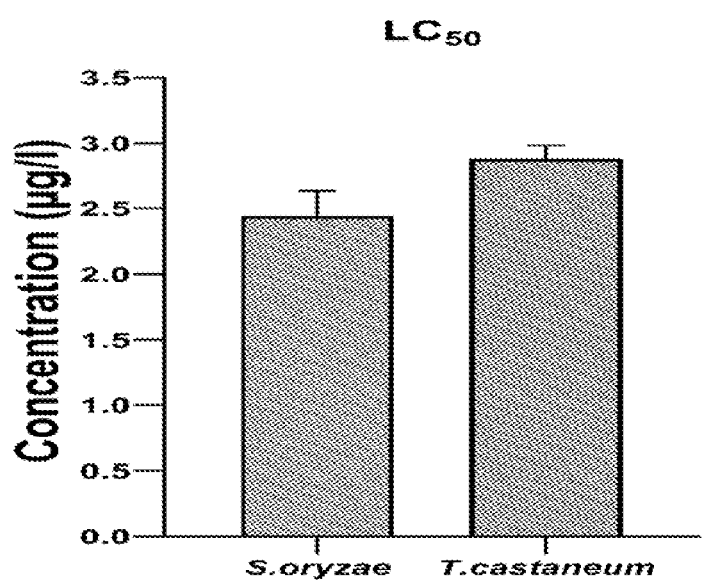
FIG. 5 depicts $LC_{50}$ values of biofumigant composition against the adults of *S. oryzae* and *T. casteneum* by fumigant toxicity.

The result indicated that isosecotanapartholide and biofumigant composition did not cause any adverse effect on seed germination (Table 3 and 5) and on plant growth (FIG. 4) of *C. arietinum* and *V. radiata* in comparison with respective control.

TABLE 3

Effect of isosecotanapartholide on seed germination of *C. arietinum* and *V. radiate*.

| | % germination (Mean ± SE) | | | |
|---|---|---|---|---|
| | Chick pea | | Green gram | |
| | 24 hours | 72 hours | 24 hours | 72 hours |
| 50 PPM | 96.00 ± 2.30 | 97.33 ± 1.33 | 93.33 ± 1.33 | 94.67 ± 1.33 |
| 100 PPM | 94.67 ± 1.33 | 96.00 ± 2.30 | 96.00 ± 2.30 | 96.00 ± 2.30 |
| Control | 98.67 ± 1.33 | 98.67 ± 1.33 | 98.67 ± 1.33 | 98.67 ± 1.33 |

Example 4: Preparation of Biofumigant Composition

For the preparation of the biofumigant composition, the compound isosecotanapartholide was obtained from aerial parts of *Artemisia vulgaris* (described in Example 1). Further, for lemon grass oil, *Cymbopogon flexuses* (lemon grass) samples were semidried at room at a temperature of 25° C.-27° C.) and chopped into 2-3 cm in length using secateurs. *Cymbopogon flexuosus*, (lemon grass) was cultivated by adopting the recommended agricultural practices in the research farm of National Bioresources Park of Institute of Bioresources and Sustainable Development, (latitude 24°8'N, longitude 93°9'E) Haraorou, Imphal, Manipur. The plant was harvested 10 cm above the ground surface and cleaned properly by removing the extraneous material. The samples were then hydro distilled (500 g each) by using Clevenger type apparatus for a duration of 4 hours. The essential oils were transferred into glass vial and dried over anhydrous sodium sulphate (Molecular weight=142.04). Further, the oil was stored at 4° C. refrigerator until the analysis was performed. The biofumigant composition was prepared in the ratio of 9.5:0.5% (Isosecotanapartholide: Lemon grass oil) in stock solution.

Example 5: Measuring the Insecticidal Activity of Biofumigant Composition

The insecticidal activity of the biofumigant composition was measured against the stored insects pests *Tribolium castaneum* and *Sitophilus oryzae* by fumigation assay. For each time point, 20 adults stored grain pests were used and determined percentage mortality. The results indicated that the biofumigant composition was toxic against two stored grain insect pests and reported $LC_{50}$ values from 2.4-2.9 µg/l and $LC_{90}$ range from 4.4-5.3 µg/l (Table 4) respectively.

TABLE 4

Insecticidal activity of biofumigant composition
(Isosecotanapartholide + lemon grass oil [9.5:0.5]) against
the adults of stored-product insects by fumigant toxicity

| Insect species | $LC_{50}{}^{a,b}$ | Slope ± SE | $LC_{90}{}^{a,b}$ | Slope ± SE | Degrees of freedom |
|---|---|---|---|---|---|
| S. oryzae | 2.45 (2.21-2.72) | 24.79 ± 0.078 | 4.41 (4.1-4.72) | 24.79 ± 0.078 | 12 |
| T. castaneum | 2.9 (2.64-3.32) | 19.90 ± 0.067 | 5.22 (4.75-5.69) | 19.90 ± 0.067 | 12 |

$^a LC_{50}$ and $LC_{90}$ = µg/L
$^b$Values in parenthesis represent confidence limits (n = 10).

Comparing the Insecticidal Activity of Biofumigant Composition with Other Fumigants (Chemical and Natural)

In order to compare the insecticidal toxicity of biofumigant composition with that of chemical and natural fumigants, $LC_{50}$ was determined for phosphine, methyl bromide and Ethyl formate and for other natural fumigants such as Carvacol, 1,8 Cineole and Linalool using fumigation bioassay procedure as described earlier. For each time point, 20 adults stored grain pests were used and determined percentage mortality. The insecticidal potency of the biofumigant and also for compound Isosecotanapartholide was comparable to that of chemical and more potent to available natural fumigants in fumigant toxicity (Table: 5). The results obtained demonstrated that the biofumigant composition was highly effective and toxic against stored insects pests *Tribolium castaneum* and *Sitophilus oryzae*.

TABLE 5

Comparison of insecticidal activity of Isosecotanapartholide
and Biofumigant formulation with the other fumigants
(chemical and Natural) $LC_{50}$ = µg/l

| | $LC_{50}$ = µg/l | |
|---|---|---|
| Fumigants | *Tribolium castaneum* | *Sitophilus oryzae* |
| Isosecotanapartholide | 2.19 | 1.82 |
| Biofumigant Composition | 2.9 | 2.45 |
| Chemical fumigants | | |
| Phosphine | 9.8 | 7.8 |
| Methyl bromide | 8.4 | 3.6 |
| Ethyl formate | 1.12 | 0.72 |
| Natural fumigants | | |
| Carvacol | 17.0 | 14.2 |
| 1,8 Cineole | 47.0 | 31.0 |
| Linalool | 49.8 | 39.2 |

Example 6: Evaluating the Effect of Biofumigant Composition on Seed Germination of *C. Arietinum* and *V. radiate*

In order to assess the effect of biofumigant composition on seed germination, particularly 50 seeds of Chickpea and Green gram sample were treated with biofumigant composition at 50 and 100 ppm and germination tests were done at 24 hours and 72 hours of exposure treatments. From each sample, twenty grains seeds were randomly selected from the treatment and soaked for about 30 minutes in distilled water, and kept on filter paper (paper towel) in a petri dish, moistened everyday with distilled water, and allowed to germinate at room temperature (25±2° C.). After 48 and 72 hours, germinated seeds were counted and percentage germination was determined as in Radwan et al. 2019 (Annals of Agricultural Sciences, 64(2), 183-187). Three replications of each were made for both treatment and control. The germinated seeds were then transferred in a muddy pot and the plant growth was observed for 2 weeks (Monda et al. 2017, Science of the Total Environment, 590, 40-49).

It was reported that there was no adverse affects of the composition on the seed germination of *C. arietinum* and *V. radiate*.

TABLE 6

Effect of biofumigant composition on seed germination of
*C. arietinum* and *V. radiate*.

| | % germination (Mean ± SE) | | | |
|---|---|---|---|---|
| | Chick pea | | Green gram | |
| | 24 hours | 72 hours | 24 hours | 72 hours |
| 50 PPM | 96.00 ± 0.8 | 96.33 ± 1.2 | 93.33 ± 1.8 | 94.67 ± 3.1 |
| 100 PPM | 95.67 ± 1.7 | 96.00 ± 1.2 | 94.3 ± 1.2 | 95.8. ± 2.0 |
| Control | 98.0 ± 1.2 | 98.04 ± 1.33 | 98.37 ± 1.4 | 98.16 ± 1.03 |

Therefore, it was reported that the biofumigant composition of the present invention is eco-friendly and highly toxic to stored product insect pests. Further, the composition can be used to treat food grain/seeds to prevent spoilage by insect pests and could also be employed in insect vectors and wood borer. In addition, the composition of the present invention does not caused any adverse effect on the seed germination and plant growth.

We claim:

1. A process for preparing a biofumigant composition, wherein the process comprises:
    (a) drying aerial parts of *A. vulgaris* at a temperature in a range of 30-40° C. for a duration of 48 hours, and powdering the dried aerial parts to obtain a dried powder;
    (b) extracting the dried powder with an organic solvent to obtain an extract;
    (c) evaporating the extract under vacuum to obtain a residue, and dissolving the residue in 15-20 ml of methanol;
    (d) fractionating the methanolic extract obtained in step c) and subjecting it to silica gel column chromatography followed by eluting with a polar solvent to obtain an active insecticidal fraction;
    (e) pooling, and concentrating the insecticidal active fraction of step d) and further purifying by flash chromatography followed by preparative high performance liquid chromatography (HPLC) to obtain a purified fraction;
    (f) obtaining a bioactive compound in a range of 90-95% from the purified fraction; and adding lemon grass oil to obtain a biofumigant composition.

2. The process as claimed in claim 1, wherein the bioactive compound is isosecotanapartholide.

3. The process as claimed in claim 1, wherein in step b), the organic solvent is selected from the group consisting of hexane, chloroform, ethyl acetate, acetone and methanol.

4. The process as claimed in claim 1, wherein in step d), the polar solvent used for eluting the active insecticidal fraction is selected from the group consisting of chloroform, ethyl acetate, and methanol.

5. The process as claimed in claim 1, wherein the bioactive compound has a molecular mass of 278.

6. The process as claimed in claim 1, wherein the biofumigant has an insecticidal activity in a range of $LC_{50}$ 2.4-2.9 µg/L in air against stored grain insects.

7. The process as claimed in claim 1, wherein the biofumigant has insecticidal properties against stored product insects selected from the group consisting of *Sitophilus oryzae, Tribolium castaneum* and *Corcyra cephalonica.*

8. The process as claimed in claim 1, wherein adding lemon grass oil comprises adding the lemon grass oil in an amount ranging from 5-10%.

\* \* \* \* \*